(12) United States Patent
Westphal et al.

(10) Patent No.: US 8,284,788 B2
(45) Date of Patent: Oct. 9, 2012

(54) METHOD FOR SCALABLE ROUTING WITH GREEDY EMBEDDING

(75) Inventors: Cedric Westphal, San Francisco, CA (US); Guanhong Pei, Blacksburg, VA (US)

(73) Assignee: NTT DoCoMo, Inc., Tokyo (JP)

( * ) Notice: Subject to any disclaimer, the term of this patent is extended or adjusted under 35 U.S.C. 154(b) by 231 days.

(21) Appl. No.: 12/512,693

(22) Filed: Jul. 30, 2009

(65) Prior Publication Data
US 2010/0290480 A1 Nov. 18, 2010

Related U.S. Application Data

(60) Provisional application No. 61/093,217, filed on Aug. 29, 2008.

(51) Int. Cl.
*H04L 12/28* (2006.01)
*H04L 12/56* (2006.01)
(52) U.S. Cl. ........................................ 370/408; 370/254
(58) Field of Classification Search .................. None
See application file for complete search history.

(56) References Cited

U.S. PATENT DOCUMENTS

| | | | |
|---|---|---|---|
| 2002/0191536 A1* | 12/2002 | LaForge et al. | 370/216 |
| 2003/0063614 A1* | 4/2003 | Teig et al. | 370/401 |
| 2005/0063318 A1* | 3/2005 | Xu et al. | 370/254 |
| 2005/0108203 A1* | 5/2005 | Tang et al. | 707/3 |
| 2006/0259597 A1* | 11/2006 | Jiang et al. | 709/222 |

OTHER PUBLICATIONS

Petar Maymounkov, "Greedy Embedding, Trees, and Euclidean vs. Lobachevsky Geometry", 2006, 19 pages.*
Petar Maymounkov: "Greedy Embeddings, Trees, and Euclidean vs. Lobackevsky Geometry", 2006.*
Chen Wang et al.: "Optimizing End to End Routing Performance in Wireless Sensor Networks", 2007.*
Yuh-Shyan Chen et al.: "Congestion-Free Embedding of Multiple Spanning Trees in an Arrangement Graph", Dec. 1998.*
PCT International Preliminary Report on Patentability for corresponding PCT Patent Application No. PCT/US2009/054661, Mar. 10, 2011, 9 pgs.
Barabsi, Albert-Laszlo, et al., "Emergence of Scaling in Random Networks", Oct. 21, 1999, 11 pgs.
Caesar, Matthew, et al., "ROFL: Routing on Flat Labels", pp. 363-374.
Karp, Brad, et al., "GPSR: Greedy Perimeter Stateless Routing for Wireless Networks", 12 pages, MobiCom2000.
Rao, Ananth, et al., "Geographic Routing without Location Information", Proceedings of ACM MobiCom 2003, Apr. 2003, 14 pages, Intel Corporation.

(Continued)

*Primary Examiner* — Phirin Sam
(74) *Attorney, Agent, or Firm* — Blakely, Sokoloff, Taylor & Zafman LLP (57) ABSTRACT

A method and apparatus is disclosed herein for scalable routing with greedy embedding. In one embodiment, the method comprises storing log(n) coordinates in a routing table, where n is the number of nodes in a network, and further wherein the log(n) coordinates are generated by constructing a greedy embedding that embeds a graph topology depicting connections between n nodes of a network into a geometric space so as to use greedy forwarding by generating a spanning tree out of a connection graph representing the connections between the n nodes of the network, decomposing the tree into at most n branches, assigning a set of geometric coordinates to vertices in the tree in an n-dimensional space, and projecting the set of geometric coordinates onto a k-dimensional space, where k is less than n, to create the log(n) coordinates; and routing packets via nodes of the network using the log(n) coordinates in the routing table.

22 Claims, 4 Drawing Sheets

OTHER PUBLICATIONS

Adjih, Cedric, et al., "Computing Connected Dominated Sets with Multipoint Relays", Ad Hoc & Sensor Wireless Networks, Mar. 3, 2005, pp. 27-39., vol. 1, Old City Publishing, Inc.

Jen, Dan, et al., "APT: A Practical Tunneling Architecture for Routing Scalability*", 15 pgs.

Kim, Young-Jin, et al., "Geographic Routing Made Practical", 14 pgs.

Krioukov, Dmitri, et al., "Compact Routing on Internet-like Graphs", Feb. 2, 2008, 29 pgs.

Cowen, Lenore J., "Compact Routing with Minimum Stretch", 6 pgs.

Deering, Steve, "The Map & Encap Scheme for Scalable IPv4 routing with portable site prefixes", Mar. 1996, 7 pgs.

Meyer, D., et al., Report from the IAB Workshop on Routing and Addressing, Feb. 27, 2007, 43 pgs.

Gupta, Anupam, "Embedding tree metrics into low dimensional Euclidean spaces", Proceedings pf the Annual Symposium on the Theory of Computing.

Oliveira, Ricardo, et al., "Geographically Informed Inter-Domain Routing", 10 pgs.

Leighton, Tom, et al., "Some Results on Greedy Embeddings in Metric Spaces", 10 pgs.

Zhang, Xinyang, et al., "Scaling IP Routing with the Core Router-Integrated Overlay", 10 pgs.

Krioukov, Dmitri, et al., "Compact Routing on Internet-like Graphs", IEEE INFOCOM 2004, 11 pgs.

Achlioptas, Dimitris, "Database-friendly random projections: Johnson-Lindenstrauss with binary coins", Journal of Computer and System Sciences 66, 2003, pp. 671-687, Elsevier Science (USA).

Maymounkov, Petar, "Greedy Embeddings, Trees, and Euclidean vs. Lobachevsky Geometry", 20 pgs.

Gavoille, Cyril, et al., "Memory Requirement for Routing in Distributed Networks", Dec. 1995, 25 pgs.

Subramanian, Sundar, et al., "On Optimal Geographic Routing in Wireless Networks with Holes and Non-Uniform Traffic", 9 pgs.

Perlman, Radia, et al., "An Algorithm for Distributed Computation of a Spanning Tree in an Extended LAN", 1985, pp. 44-53, ACM.

Leong, Ben, et al., "Greedy Virtual Coordinates for Geographic Routing", 10 pgs.

Kleinberg, Robert, "Geographic Routing Using Hyperbolic Space", 9 pgs.

Papadimitriou, Christos, H., et al., "On a Conjecture Related to Geometric Routing", 12 pgs.

Durocher, Stephane, et al., "On Routing with Guaranteed Delivery in Three-Dimensional Ad Hoc Wireless Networks", 2008, pp. 546-557, Springer-Verlag Berlin Heidelberg.

Chen, Mirela Ben, et al., "Distributed Computation of Virtual Coordinates", Jun. 2007, 10 pgs., ACM.

Gavoille, Cyril, et al., "Space-Efficiency for Routing Schemes of Stretch Factor Three", Oct. 1997, 24 pgs.

Leong, Ben Wing Lup, "New Techniques for Geographic Routing", May 2006, 148 pgs.

Thorup, Mikkel, et al., "Compact routing schemes", 2001, SPAA '01, 10 pgs.

Caesar, Matthew, et al., "Virtual Ring Routing: Network Routing Inspired by DHTs", SIGCOMM '06, Sep. 2006, 12 pgs.

Westphal, Cedric, et al., "Scalable Routing via Greedy Embedding", INFOCOM 2009. The $28^{th}$ Annual Conference on Computer Communications, Apr. 19, 2009, pp. 2826-2830, IEEE, Piscataway, NJ, USA.

Charikar, M., et al., "Approximating a Finite Metric by a Small Number of Tree Metrics", $39^{th}$ Annual Symposium on Foundations of Computer Science, Nov. 8, 1998, pp. 379-388, IEEE Comp. Soc. US.

Borodin, Allan, et al., "Subquadratic Approximation Algorithms for Clustering Problems in High Dimensional Spaces", Machine Learning, Jul. 1, 2004, pp. 153-167, vol. 56, No. 1-3, Kluwer Academic Publishers, Netherlands.

PCT International Search Report for PCT Patent Application No. PCT/US2009/054661, Nov. 5, 2009, 6 pgs.

PCT Written Opinion of the International Searching Authority for PCT Patent Application No. PCT/US2009/054661, Nov. 5, 2009, 9 pgs.

* cited by examiner

METHOD FOR SCALABLE ROUTING WITH GREEDY EMBEDDING

The present patent application claims priority to and incorporates by reference the corresponding provisional patent application Ser. No. 61/093,217, titled, "A Method for Scalable Routing with Greedy Embedding," filed on Aug. 29, 2008.

FIELD OF THE INVENTION

Embodiments of the present invention relate to the field of network routing; more particularly, embodiments of the present invention relate to scalable routing with greedy embedding and greedy forwarding.

BACKGROUND OF THE INVENTION

The scalability of routing impacts many systems in many application scenarios. The exponential growth of the BGP routing table has been a growing concern, and several schemes have been proposed to address this problem.

One proposed solution to this scalability problem has been to assist Internet Protocol (IP) routing with some geographic routing. For other systems such as ad hoc networks, which, unlike IP networks, have no universally known global addresses, geometric (or geographic) routing can also enhance the scalability of the routing.

Greedy forwarding is also well-known and requires very little routing state: a packet is forwarded to a destination point based on the relative distance of this point with that of the neighbors of the node holding the packet. More specifically, in greedy forwarding, a packet is forwarded to the node which minimizes the distance to the destination. Each node thus is only required to know the position of its neighbors to forward packets and the size of the routing table is proportional to the degree of the node. Such routing is both local, and memoryless.

Geometric routing based on the actual location of the nodes requires accurate knowledge of the node's location. Further, the physical location of the nodes might not coincide with the connectivity of the network. To take advantage of the network topology, it has been proposed to build virtual (geographic) coordinates on top of the graph created by the network connectivity. Greedy routing is then performed on these virtual coordinates.

Kleinberg, in "Geographic Routing Using Hyperbolic Space," in Proceedings of IEEE Infocom, 2007, showed how to construct a greedy embedding onto the 2-dimensional hyperbolic plane. This does not however solve the issue of scalability, since the coordinates in the hyperbolic plane in Kleinberg's scheme require n bits to describe the location of one node, where n is the number of nodes in the network. This implies that, even though the number of entries in the route table is scalable, the size of each entry is not.

SUMMARY OF THE INVENTION

A method and apparatus is disclosed herein for scalable routing with greedy embedding. In one embodiment, the method comprises storing log(n) coordinates in a routing table, where n is the number of nodes in a network, and further wherein the log(n) coordinates are generated by constructing a greedy embedding that embeds a graph topology depicting connections between n nodes of a network into a geometric space so as to use greedy forwarding by generating a spanning tree out of a connection graph representing the connections between the n nodes of the network, decomposing the tree into at most n branches, assigning a set of geometric coordinates to vertices in the tree in an n-dimensional space, and projecting the set of geometric coordinates onto a k-dimensional space, where k is less than n, to create the log(n) coordinates; and routing packets via nodes of the network using the log(n) coordinates in the routing table.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for scalable routing in a network that has multiple nodes. In one embodiment, the routing is performed using virtual coordinates generated from a greedy embedding. In one embodiment, greedy embeddings are constructed in polylogarithmic dimensional Euclidian spaces in order to achieve scalable routing through geographic routing. In one embodiment, the method uses random projection to achieve greedy forwarding on a space of dimension $O(\log(n))$ where nodes have coordinates of size $O(\log(n))$, thus achieving greedy forwarding using a route table at each node of polylogarithmic size with respect to the number of nodes. In one embodiment, a greedy embedding is constructed such that the size of each entry in the route table is of order $\log^2(n)$, and the number of entries at each node is the degree of the node.

In another embodiment, the method uses a quasi-greedy algorithm which ensures greedy forwarding works along a pathwise construction, allowing further reduction of the dimension of the embedding. In one embodiment, quasi-greedy embedding improves the performance of the greedy routing and further reduces the dimension of the embedding space, although its scaling behavior stays the same as $O(\log^2(n))$.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A network of nodes that routes packets or other information between each other is described herein. Each of the nodes includes routing table and routing logic that are used to route information throughout the network with the use transmitter and receiver functionality in the node.

The network of nodes may be represented in a topology graph. In the graph G, it is assumed that all edges have equal weight, say 1, so that shortest path routing on the graph corresponds to minimizing the hop count. This can be generalized to assigning other weight to the edges in E. In one embodiment, a geographic routing overlay is constructed above the network topology to ensure scalable routing using greedy forwarding. The initial graph topology is embedded in a metric space in a way which preserves the connectivity property. Given a connection graph G=(V,E), where V is the set of nodes or routers, and E represents the (bi-directional) links between these nodes, virtual coordinates are constructed in a metric space (X,d) on which to perform routing, using the distance d for greedy forwarding.

Define n=|V|, so that the network has n nodes. For v∈V, define by $N_v$, the set of neighbors of v, that is: $N_v = \{w \in V, (v, w) \in E\}$.

Definition 1.1: A greedy embedding is a mapping f: V→X such that ∀u, w∈V, u≠w:

$$\exists v \in N_u \text{ such that } d(f(v), f(w)) < d(f(u), f(w)) \quad (1),$$

which is well-known in the art.

Namely, a greedy embedding is an embedding such that, at each vertex, there always exists at least one neighbor which is closer to the destination. In other words, there is no local minimum in a greedy embedding, and greedily forwarding the packets ensures that they reach the destination.

For any graph to be embedded into a Euclidian space, the dimension of the Euclidian space has to be at least log(n). Since log(n) bits are already required merely to express the name of a node in the network, embedding into a space of log(n) dimension is extremely attractive from a scalability perspective, provided each of the log(n) coordinates can be expressed concisely.

Thus, the ability to construct a greedy embedding depends on the graph G=(V,E) and on the embedding space (X, d).

Routing Based on Greedy Logarithmic Virtual Embedding.

Figure 1:
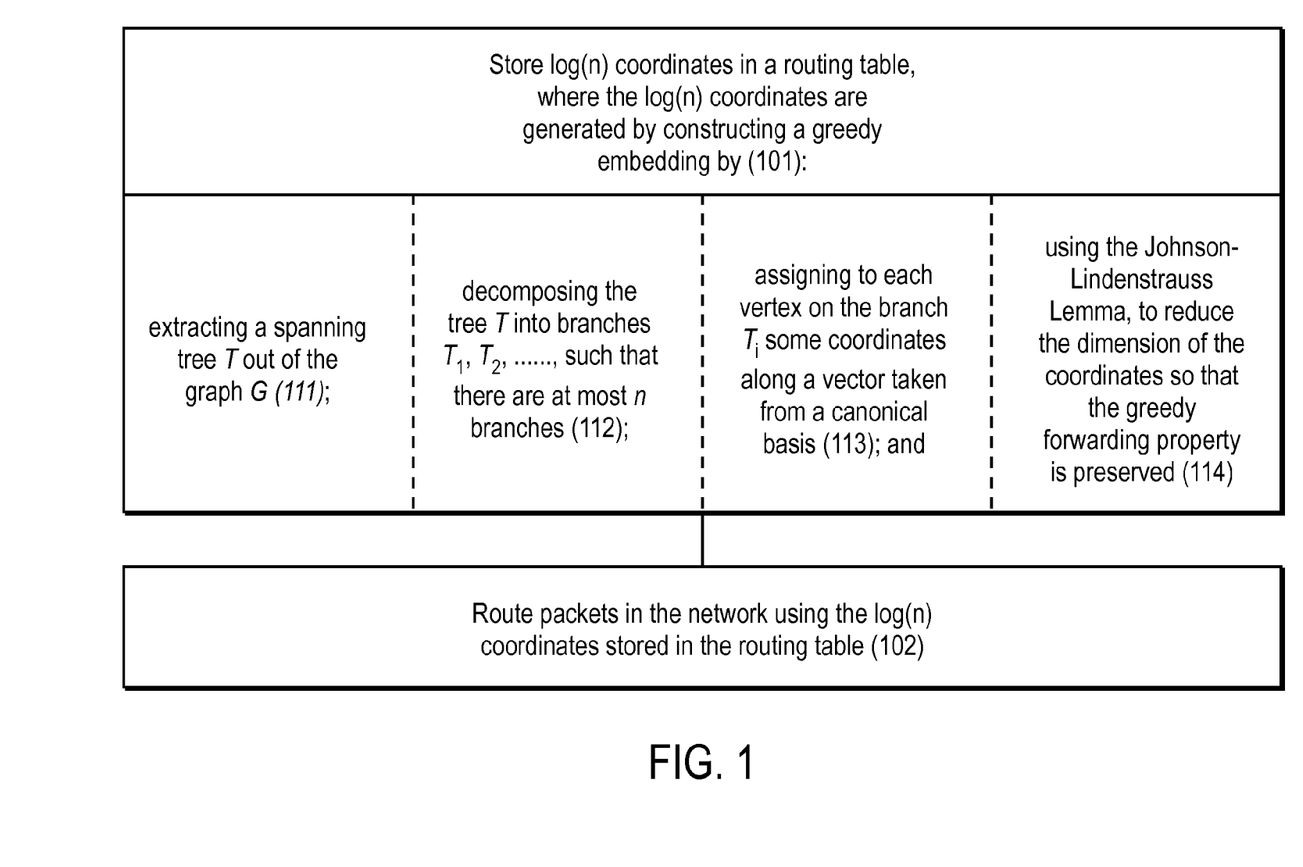
FIG. 1 is a flow diagram of one embodiment of a routing process.

FIG. 1 is a flow diagram of one embodiment of a process for transferring packets or other data over a network. The process is performed by processing logic that may comprise hardware (circuitry, dedicated logic, etc.), software (such as is run on a general purpose computer system or a dedicated machine), or a combination of both.

Referring to FIG. 1, the process begins by storing log(n) coordinates in a routing table in a node in a network having n nodes, where the log(n) coordinates represent the nodes and are generated by constructing a greedy embedding that embeds a graph topology that depicts connections between the nodes into a geometric space in such a way that greedy forwarding is used (processing block 101). The process for generating a greedy logarithmic virtual embedding comprises first creating a tree-based system of coordinates which satisfies the greedy forwarding property, and then using greedy forwarding to route along short-cuts on the links outside of the tree.

In one embodiment, the virtual embedding is generated by extracting a spanning tree T out of the graph G (processing block 111); decomposing the tree T into branches $T_1$, $T_2$, ..., such that there are at most n branches (processing block 112); assigning to each vertex on the branch $T_i$ some coordinates along a vector taken from the canonical basis $\epsilon = \{e_1, \ldots, e_n\}$, where $e_i$ is the vector with a 1 in the i-th position and zeroes otherwise (processing block 113); and using the Johnson-Lindenstrauss Lemma, to reduce the dimension of the coordinates from n to $\log(n) = \epsilon^2$, with $\epsilon$ chosen so that the greedy forwarding property is preserved (processing block 114).

For small $\epsilon$, $k=0(\log(n)=\epsilon^2)$ can become quite large, where k is an integer less than n and is described in more detail below. Large values of $\epsilon$ implies that the random projection of the JL Lemma will have too much distortion to ensure that the embedding is always greedy. In one embodiment, a recovery mechanism is used to facilitate recovery when routing hits a minima. This is described in more detail below.

Note that generating the embedding may be done on a centralized or distributed manner. Each operation for constructing the embedding is described in more detail below.

Processing logic then routes packets using one or more nodes in the network using the log(n) coordinates generated above and stored in the routing table (processing block 102).

Figure 2A:
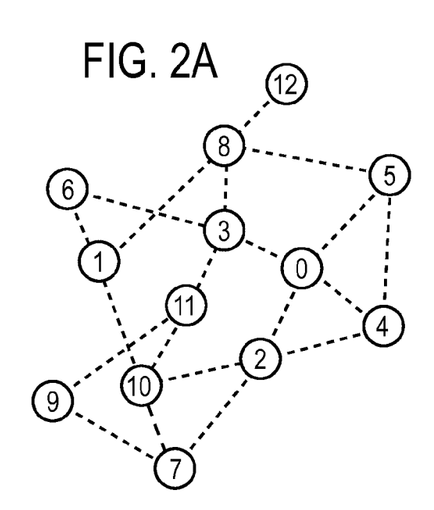
FIG. 2 illustrates operations for generating an embedding on a toy example.
Figure 2B:
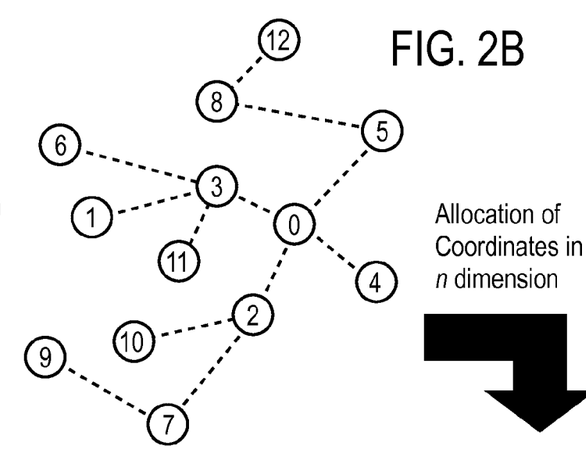
Figure 2C:
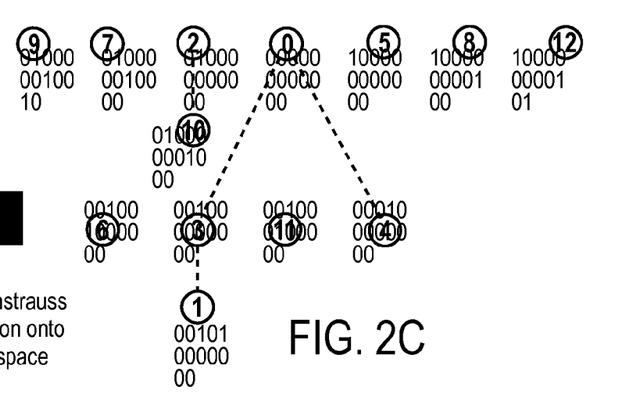
Figure 2D:
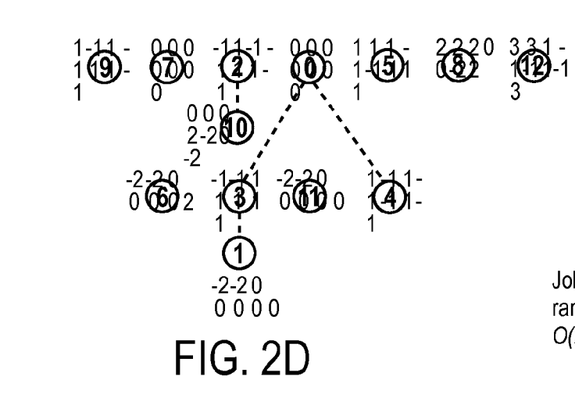

FIGS. 2A-D illustrate one example illustrating the construction of a greedy embedding. FIG. 2A illustrates a network graph of a network topology is shown. FIG. 2B illustrates a tree that is extracted from the graph of FIG. 2A using the spanning tree protocol decomposition. FIG. 2C illustrates allocation or assignment of coordinates in dimension n (via short-branch decomposition in this example). FIG. 2D illustrates a Johnson Lindenstrauss random projection to project the n-dimensional coordinates onto a k-dimensional space. In one embodiment, the k-dimensional space is 0 (log(n)) state space.

Spanning Tree

The process of constructing the embedding begins by first constructing a spanning from the graph G=(V,E). Several methods are possible, and have different levels of complexity. In one embodiment, edges with all weights identical and equal to 1 are chosen; in such a case, all spanning trees will be minimal spanning trees.

In one embodiment, a spanning tree is generated by constructing a connected dominating set (CDS), ensuring that the CDS is a tree subgraph of G, and connecting each vertex not in the CDS to the CDS using exactly one edge, in a manner well-known in the art. This approach constructs a tree which is independent of the starting point for the construction.

In another embodiment, a spanning tree is generated using the STP protocol as follows: starting from the node with the lowest identifier, set it as the root of the tree. Each edge has an associated cost. In one embodiment, the cost is set by the operator (cost to manage a link), or it is set by the link characteristics (e.g., by the capacity of the link). The root floods (i.e. send on all links except those where the flooding message has already been sent) the graph with a message which is updated at each vertex so that each vertex can compute the minimal cost path back to the root. The cost is computed as the sum of the weight of the edges. Each node sets as UP the vertex towards the root used by the minimal cost path. The tree is composed of all the UP vertex and leaf nodes.

In one embodiment, the root is picked at random to construct the spanning tree, by having each node choosing its identifier independently from a uniform (0,1) distribution.

For purposes herein, T denotes the tree obtained from the graph G.

Tree Decomposition

The tree T is decomposed in branches in order to assign geometric coordinates to the vertices. Each branch corresponds to a direction in the vector space. Formally, a branch $T_j$ is a sequence of vertices in the tree $u_1$, $u_2$, $u_{|T_j|}$ such that $(u_i, u_{i+1}) \in E$ for $1 \leq i \leq |T_j|$.

There are many ways of decomposing the tree T obtained above into branches $T_1$, $T_2$, .... In one embodiment, caterpillar decomposition is used. This decomposition finds the longest sequence of edges in the tree (that is the longest sequence $(v_1, v_2, \ldots, v_l)$ such that $(v_i, v_{i+1}) \in T \subset E$ and no vertex appears more than once), and assigns it to $T_1$. It then finds the second longest, which becomes $T_2$, and so on until all vertices belong to a branch $T_i$. In another embodiment, short-branch decomposition is used in which a new orthogonal dimension is assigned to each vertex in the tree T. Namely, each vertex becomes its own branch $T_i$.

Other tree decompositions into branches are possible. The caterpillar decomposition will find the longest branch, while the short-branch decomposition will have branches of length 1.

The embedding will preserve the greedy forwarding along the tree. However, tree routing does not perform well: many edges in E are potentially not included in T. Greedy forwarding however can take short-cuts off the tree. The short-branch decomposition places two vertices k hops away on the tree at distance $\sqrt{k}$ in the decomposition, while this distance can be up to k in the caterpillar decomposition. The short-branch decomposition is thus more compact and intuitively offers more short-cut opportunities.

Geographic Coordinate Assignment

To assign the geometric coordinates, coordinates $(0, \ldots, 0)$ are assigned in n-dimension from the root of the tree. The assignment process starts by defining a mapping g from $T \to l_2^2$, that is from the graph to a n-dimensional Euclidian space.

Take one branch which contains the origin. It can be written as 0, $u_1$, ..., $u_p$. Assign the coordinates $g(u_i)=ie_i$ to the vector $u_i$ in this branch.

For each branch that contains a point already with a mapping to the embedded coordinates, iterate the assignment. For instance, if $T_i$ is the branch $v_1, \ldots, v_l$, where $g(v_1)$ is already defined, then assign $g(v_h)=g(v_1)+(h-1)e_i$ for $1 \leq h \leq l$.

In the embodiment in which the short-branch decomposition is used, each branch contains a single link, and the process involves iterating the following procedure: assume the assignment has been performed for all nodes up to i hops away from the root. For each node v at depth i+1, define its parent by p(v). Then $g(v)=g(p(v))+e_j$ where $e_j \in$ has not been assigned to any branch yet, where $\epsilon = \{e_i, 1 \leq i \leq n\}$ the canonical orthonormal basis of $\mathfrak{R}^n$, i.e., $e_i$ is the vector with a 1 in the i-th coordinate, and 0 otherwise. Note that there are n−1 branches in the short-branch decomposition, and $|\epsilon|=n$, so such assignment is always feasible.

Next, a conversion between n-dimensions and k-dimensions occurs where integer k<n. From this point on, the only metric used is the $l_2$ norm. The distance between x, $y \in \mathfrak{R}^k$ is thus $d(x,y)=\|y-x\|=\sqrt{\sum_{i=1}^{k}(x_i-y_i)^2}$.

In one embodiment, k vectors $r^1, \ldots, r^k$ are defined in $l_2^n$. Each coordinate of $r^j$, $1 \leq j \leq k$, namely $r_i^j$, $1 \leq i \leq n$, is set to be an i.i.d. Normal(0,1) random variable.

For $x \in l_2^n$, a function can be defined $f: l_2^n \to l_2^k$ such that:

$$f(x) = \frac{1}{\sqrt{k}} (<x, r^1>, <x, r^2>, \ldots, <x, r^k>) \quad (2)$$

where $f$ is a random projection of $l_2^n$ onto $l_2^k$. In one embodiment, the function $f$ from Equation (2) is used to obtain the final coordinates $f(g(v))$ for node $v \in V$.

The Johnson-Lindenstrauss Lemma:

Lemma: Pick $0<\epsilon<1$. For $u,v \in l_2^n$, and for $k>k_o$, where $(k_0=0(1/)\epsilon^2 \log(n))$, $$(1-\epsilon) \leq \frac{\|f(u)-f(v)\|^2}{\|u-v\|^2} \leq (1+\epsilon) \quad (3)$$

The Johnson-Lindenstrauss (JL) Lemma states that one can reduce the dimension of the space and project from a n-dimensional space onto a k-dimensional space, while still respecting the distance between points within some ϵ factor. In one embodiment, the ϵ factor is between 0 and 1; the lower ϵ, the less distortion.

The JL lemma is refined using $r_j$, $1 \leq j \leq k$ vectors which have i.i.d. coordinates $r_j^i$, $1 \leq i \leq n$ drawn from the Rademacher distribution, that is equal to 1 or −1 with equal probability. A refinement of the JL lemma, described in Achlioptas, "Database-friendly Random Projections: Johnson-Lindenstrauss with Binary Coins," Journal of Computer and System Sciences, vol. 66, no. 4, pp. 671-687, June 2003, is used below, as it is less computationally intensive while the distortion is no worse than previous JL implementations. For the JL lemma described above, $k_o$ is chosen as $4 \log(n)/(\epsilon^2/2 - \epsilon^3/3)$. For the Achlioptas procedure, for any $\beta > 0$, using $k_o = (4+2\beta) \times \log(n) = ((\epsilon^2/2 - \epsilon^3/3)$ ensures that Equation (3) is satisfied with probability $1 - n^\beta$.

Alternative Embodiments

Several alterations may be made to the process for generating an embedding.

Multiple Embeddings

One variant is to construct multiple embeddings: since each embedding has a polylogarithmic dimension, then computing m parallel embeddings, using m different trees, yielding m sets of coordinates, still has the same scaling behavior if $m = 0(1)$. One embodiment of the process for constructing multiple embeddings is as follows:

Iterate m times: randomly pick a vertex in V to be the root (if the vertex has been selected already, repeat until a new vertex is found); generate a tree using the STP method; generate coordinates (as described above) for each of the m trees; for any vertex u in the graph, this creates m sets of coordinates $X_i = x_1^i, \ldots, x_k^i$ in $l_2^k$, with $k = 0(\log(n))$ and $1 \leq i \leq m$. As constructed, $X^i = f(g_i(u))$, where $g_i(u)$ is based on the i-th tree.

There are several alternatives for the routing on these coordinates.

1) Perform greedy routing based on the vectors $X^c = (X^1, \ldots, X^m)$ in $l_2^{km}$.
2) For each node u routing a packet to w, compute the distance $d_i(u,w)$ for all $1 \leq i \leq m$. In one embodiment, pick i such that this distance is minimized. In an alternative embodiment, pick i such that the distance $d_i(v_i, w)/d(u,w)$ is minimized for first hop neighbor $v_i$ in the i-th set of coordinates. Once a set of coordinates i is selected, the coordinates are included in the packet header, and the routing is subsequently performed according to the coordinates X for the vertices.
3) Perform greedy routing based on the metric defined by averaging the m distances. For example, where $X^i$ defines a distance $d_i(u,v)$, then define $d^a = 1/m \Sigma_i d_i$ and route along this distance in a greedy manner, where $d^a$ is the average distance.

Up-Tracking

Another modification of the embedding constructing process procedure includes up-tracking, which is described below.

Recall that $k_o = 0(\log(n) = \epsilon^2)$. Thus, some values of $k < k_o$ cause high distortion in the embedding, and greedy forwarding using the embedding described above does not find all the source-destination paths. The random projection still creates local minima.

One mechanism to recover from local minima in this case works in two phases: first, during the construction of the embedding, it is ensured that the embedding is path-wise greedy between any node and the tree root. In one embodiment, for a node $v_k \in V$ such that the path to the root $v_o$ is $v_k$, $v_{k-1}, \ldots, v_1, v_0$, the coordinates of $v_k$ are generated to ensure that:

$$d(v_k, v_i) < d(v_k, v_{i-1}), \text{ for all } 1 \leq i \leq k-1 \quad (4)$$

This guarantees that the path from $v_k$ to the root satisfies the greedy forwarding property. To achieve this, the following is performed: recall that the coordinates of $v_k$ in the embedding is computed as $f(g(v_k)) = f(g(v_{k-1})) + f(e_1)$, for some $e_1 \in \epsilon$ which is used for this edge $(v_{k-1}, v_k)$ exclusively. Also, recall that $$f(e_l) = \frac{1}{\sqrt{k}}(<e_l, r^1>, <e_l, r^2>, \ldots, <e_l, r^k>)$$
$$= \frac{1}{\sqrt{k}}(r_l^1, \ldots, r_l^k),$$

with $r_l^i$ all i.i.d. random variables with equiprobable value $\pm 1$. Thus, a candidate for $f(g(v_k))$ is generated by computing a set of random variables $(r_l^1, \ldots, r_l^k)$ with the proper distribution. Then a check is made to determine if Equation (4) is satisfied. If it is not, then the procedure is re-iterated with a fresh new set of r.v. $(r_l^1, \ldots, r_l^k)$. The greedy property is path-wise satisfied on the tree, so that a vector $(r_l^1, \ldots, r_l^k)$ can always be found in the random projection which satisfies the path-wise greedy property in the embedding.

In one embodiment, the routing has two phases: a greedy phase and a recovery phase. The greedy phase proceeds as usual. When a packet reaches a local minima, i.e. when the packet reaches a node which is closer to the destination than any of its neighbors, the routing enters the recovery phase. In the recovery phase, the node simply forwards the packet to its parent in the tree. Since it is going up in the tree, this is called up-tracking. The intuition is that: since the packet is at a local minimum, it is not on a path from the root to the destination, where greedy forwarding is ensured by construction. Thus, going down on the tree is going in the wrong direction. On the other hand, is it known that there exists a path-wise greedy path from the root to any destination, thus up-tracking always gets the packet closer to a valid greedy path.

As soon as possible, the packet resumes greedy forwarding. That is, the tracking goes up parent to parent until it finds a greedy path from which to continue. The packet also carries a short black list of nodes which are local minimum, in order to avoid ping-ponging between two nodes. A node checks first that the next hop for greedy forwarding is not on the black list before forwarding.

Unlike pure greedy forwarding, this scheme is not memoryless anymore.

A Distributed Algorithm

In order to make the algorithm local, only the short-branch tree decomposition is used because the short-branch decomposition has an important property: the assignment of the vector $e_l$ to the l-th link is independent of the prior vectors assignments.

With a decomposition that assigns the same vectors to different links, so that the coordinates are aligned along that vector's direction, one needs to keep track of the whole branch, including which edge belongs to which branch so that the proper direction is assigned. With the short-branch decomposition, since each branch contains exactly one link, the vector assignment process can be memoryless. Actually, since $e_l$ is a vector extracted from a known distribution which is used only for one link, it can be locally generated.

In one embodiment, the distributed algorithm builds the tree T and the embedding coordinates at the same time using a modified version of the STP protocol. Each node attempts to generate a tree rooted at itself, and then announces this tree to its neighbors. When receiving such announcement, nodes either join the tree, or discard the message. An example of one such distributed algorithm is given below.

Distributed Algorithm Example

Each node starts by generating a random ID.

If node v does not belong to any tree, it creates a tree message. The tree message contains the sender's ID, the root ID, the level of the tree (that is the number of hops to the root), and the pathwise coordinates to the root. As v does not belong to any tree, its tree message will include (source=v, root=v, level=0, $f(g(v))=0$). The number of coordinates on the path is a variable length field which has length (level+1) times the virtual coordinates's size. v sets itself as belong to the tree defined by the tree message.

Upon receiving a tree message from v, node u checks that its current tree root ID (or, if it does not yet belong to any tree, its own ID) is more than the root ID advertised in the message.

if the current tree root ID is more than the received root ID, then u replaces its tree by the tree advertised in the message, sets v as its UP node, and generates new embedding coordinate consistent with the pathwise coordinates in the tree message (as described in above). This can be perforin locally since all the random variables are i.i.d. and are used exclusively for one link on the tree, thus do not need to be exchanged with other nodes. It then re-broadcasts the tree message with updated source, level, and pathwise coordinates information.

if the current tree root ID is equal to the received root ID, but the tree message level is strictly lower than the current level minus one, then it again replaces its tree by the tree advertised in the message, sets v as its UP node, generates new coordinates and propagates the tree message as previously.

if the current tree root ID is less than the received root ID, or equal with a tree message level great or equal to the current level minus one, then it discards the packet.

Figure 3:
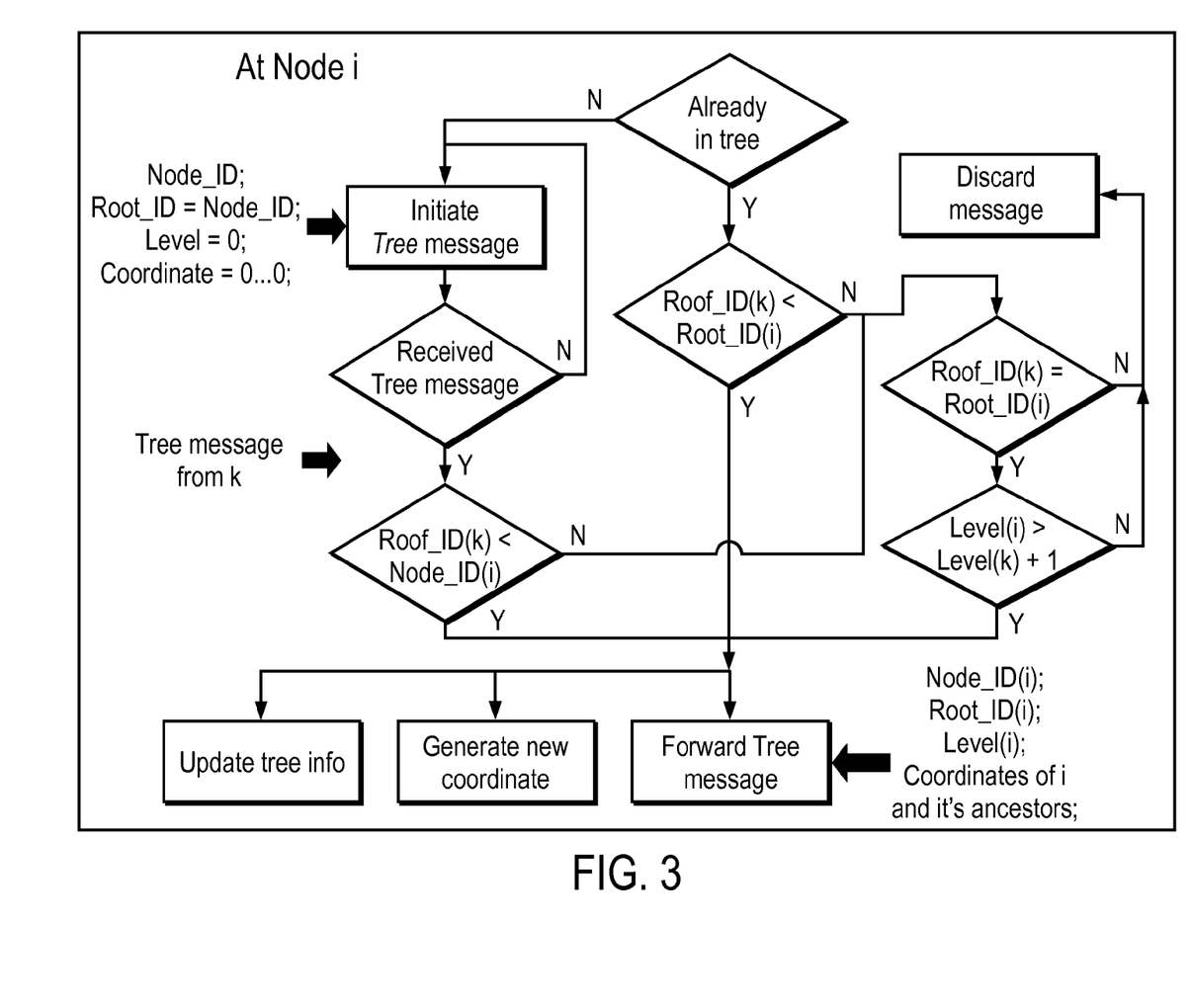
FIG. 3 illustrates a distributed algorithm for a node to generate an embedding.

The algorithm is pictorially described on FIG. 3. Note that the amount of information shared by the distributed algorithm is proportional to the diameter of the network in the worst case. For most networks, this would entail a scaling behavior of the tree message as $O(\log(n))$.

An embedding of graphs into a set of virtual coordinates, combined with a distributed routing algorithm has been set forth herein, which ensure that routing on the embedded coordinates always finds the destination.

The embedding is constructed by extracting a randomly rooted spanning tree from the graph, and assigning coordinates, first in a n-dimensional Euclidian space, then on a k-dimensional Euclidian space, where $k=O(\log(n))$. The transformation from n to k dimensions is performed using the Achlioptas-modified Johnson-Lindenstrauss random projection method, because of its computational simplicity.

The embedding relies on a pathwise greedy construction, which ensures the existence of at least one greedy path between two points. The routing uses an up-tracking mechanism should a packet encounter a local minimum by using a shortcut off the underlying tree.

The distributed algorithm can apply to mobile networks where the mobility is constrained to the edge of the topology, as in for instance cellular networks or wireless mesh networks with a static infrastructure. Indeed, a node can compute its virtual coordinates locally based on the coordinates of its attachment point.

An Exemplary Computer System

Figure 4:
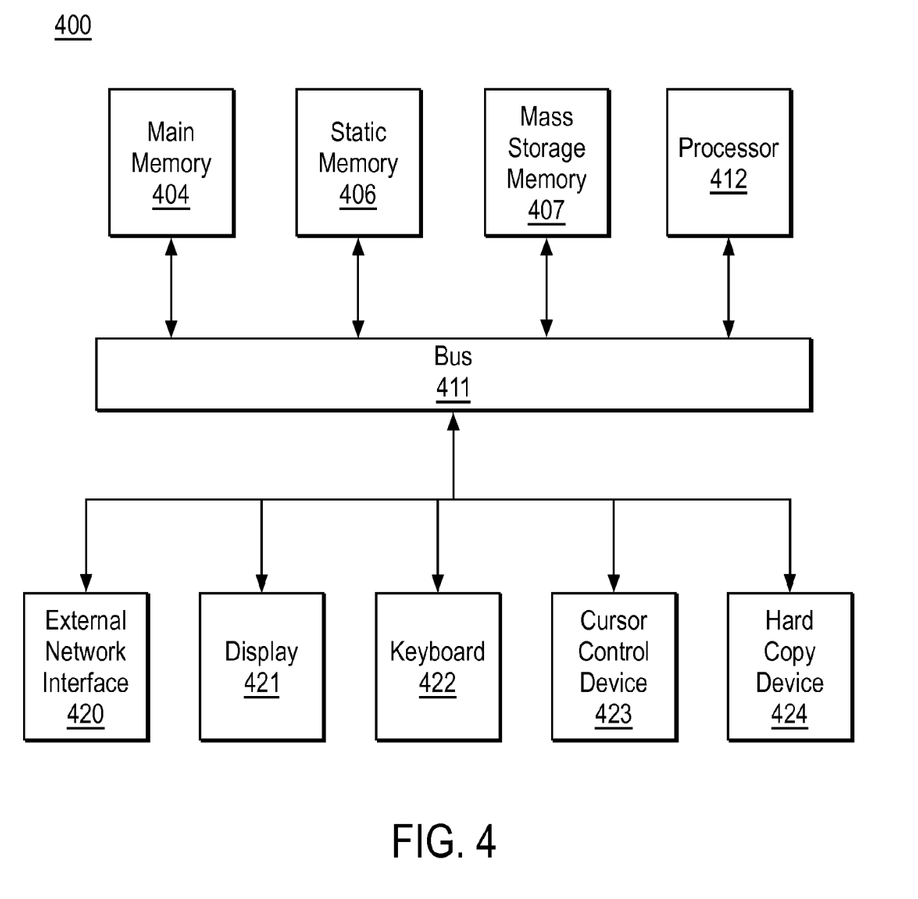
FIG. 4 is an example of a computer system.

FIG. 4 is a block diagram of an exemplary computer system that may perform one or more of the operations described herein, such as operations of a node and/or operations to generate the embeddings described above. Referring to FIG. 4, computer system 800 may comprise an exemplary client 450 or server 400 computer system. Computer system 400 comprises a communication mechanism or bus 411 for communicating information, and a processor 412 coupled with bus 411 for processing information. Processor 412 includes a microprocessor, but is not limited to a microprocessor, such as, for example, Pentium™ PowerPC™, Alpha™, etc.

System 400 further comprises a random access memory (RAM), or other dynamic storage device 404 (referred to as main memory) coupled to bus 411 for storing information and instructions to be executed by processor 412. Main memory 404 also may be used for storing temporary variables or other intermediate information during execution of instructions by processor 412. Memory 404 may also be used to store a routing table and instructions for performing routing through a network, such as are described above.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Data storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, trackpad, stylus, or cursor direction keys, coupled to bus 411 for communicating direction information and command selections to processor 412, and for controlling cursor movement on display 421.

Another device that may be coupled to bus 411 is hard copy device 424, which may be used for printing instructions, data, or other information on a medium such as paper, film, or similar types of media. Furthermore, a sound recording and playback device, such as a speaker and/or microphone may optionally be coupled to bus 411 for audio interfacing with computer system 400. Another device that may be coupled to bus 411 is a wired/wireless communication capability 425 to communication to devices such as network nodes.

In one embodiment, system 400 includes an external network interface 420 coupled to bus 411. This may include a network interface card (NIC).

Note that any or all of the components of system 400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    storing log(n) coordinates in a routing table within a non-transitory machine readable medium, where n is the number of nodes in a network, and further wherein the log(n) coordinates are generated by constructing a greedy embedding that embeds a graph topology depicting connections between n nodes of a network into a geometric space so as to use greedy forwarding by:
    generating a spanning tree out of a connection graph representing the connections between the n nodes of the network,
    decomposing the tree into at most n branches,
    assigning a set of geometric coordinates to vertices in the tree in an n-dimensional space, and
    projecting the set of geometric coordinates onto a k-dimensional space, where k is less than n, to create the log(n) coordinates;
    routing packets via nodes of the network using the log(n) coordinates in the routing table; and
    wherein the spanning tree is generated by each node attempting to generate the tree routed in itself, and further comprising announcing the tree to its neighbors using a tree message to have the neighbors join the tree or discard the message from the node.

2. The method defined in claim 1 wherein the spanning tree is generated using STP.

3. The method defined in claim 1 wherein the n-dimensional and k-dimensional spaces are Euclidian spaces.

4. The method defined in claim 1 wherein decomposing the tree into branches is performed using either caterpillar decomposition or short-branched decomposition.

5. The method defined in claim 1 wherein projecting the n-dimensional coordinate set onto the k-dimensional space comprises transforming coordinates from n to k dimensions using the Achlioptas-modified Johnson-Lindenstrauss random projection method.

6. The method defined in claim 1 wherein k is equal to $0(\log(n)/f^2$, where $f$ is selected that the greedy forwarding property is preserved.

7. The method defined in claim 1 wherein routing based on the log(n) coordinates uses greedy forwarding to route the packets.

8. The method defined in claim 1 further comprising entering a recovery phase during routing if a packet reaches a node which is closer to the destination than any of its neighbors, yet does not reach its destination.

9. The method defined in claim 1 wherein the tree and the embedding coordinates are generated at the same time.

10. The method defined in claim 1 wherein generating the log(n) coordinates is performed in a distributed fashion.

11. The method defined in claim 10 further comprising a node checking whether its current tree route ID is more than the route ID specified in a tree message received from another node, wherein if the current tree route ID is more than the route ID specified in the tree message, then the node replacing its tree by the tree specified in the message, setting the route as its uptracking node, and generating a new embedding coordinate consistent with the path-wise coordinates in the tree message, wherein, if the current tree ID is equal to the received route ID, but the tree message level is lower than the current level minus one, then the node replacing its tree, generating new coordinates, and propagating the tree message, and if the current tree route ID is less than the received route ID, or equal to where the tree message level greater or equal to the current level minus one, then the node discarding the packet.

12. The method defined in claim 1 further comprising:
    constructing multiple embeddings in parallel using a number of different trees yielding a plurality of sets of coordinates; and
    routing on these coordinates.

13. A network comprising:
    a plurality of nodes that route packets between each other using coordinates in a router table, the router table being stored within a non-transitory machine readable medium, wherein the coordinates in the routing table are generated by constructing a greedy embedding that embeds a graph topology depicting connections between n nodes of a network into a geometric space so as to use greedy forwarding, using a method comprising
    generating a spanning tree out of a connection graph representing the connections between the n nodes of the network,
    decomposing the tree into at most n branches,
    assigning a set of geometric coordinates to vertices in the tree in an n-dimensional space,
    projecting the set of geometric coordinates onto a k-dimensional space, where k is less than n, to create the log(n) coordinates; and
    wherein the spanning tree is generated by each node attempting to generate the tree routed in itself, and further comprising announcing the tree to its neighbors using a tree message to have the neighbors join the tree or discard the message from the node.

14. A method comprising:
    constructing a greedy embedding in a polylogarhythmic dimensional Euclidian space to achieve routing through geometric routing, including embedding a topological graph of nodes in a network into a metric space in a way to preserve the connectivity property of nodes in the graph;
    using a routing table at each node in the network to route packets between nodes in the network using coordinates from the greedy embedding, the routing table being stored within a non-transitory machine readable medium; and
    wherein a spanning tree is generated by each node attempting to generate the tree routed in itself, and further comprising announcing the tree to its neighbors using a tree message to have the neighbors join the tree or discard the message from the node.

15. An article of manufacture having one or more non-transitory computer readable storage media storing instructions thereon which when executed by a system cause the system to perform a method comprising:
    storing log(n) coordinates in a routing table, where n is the number of nodes in a network, and further wherein the log(n) coordinates are generated by constructing a greedy embedding that embeds a graph topology depicting connections between n nodes of a network into a geometric space so as to use greedy forwarding by
    generating a spanning tree out of a connection graph representing the connections between the n nodes of the network,
    decomposing the tree into at most n branches,
    assigning a set of geometric coordinates to vertices in the tree in an n-dimensional space, and projecting the set of geometric coordinates onto a k-dimensional space, where k is less than n, to create the log(n) coordinates;

routing packets via nodes of the network using the log(n) coordinates in the routing table; and wherein the spanning tree is generated by each node attempting to generate the tree routed in itself, and further comprising announcing the tree to its neighbors using a tree message to have the neighbors join the tree or discard the message from the node.

16. An article of manufacture having one or more non-transitory computer readable storage media storing instructions thereon which when executed by a system cause the system to perform a method comprising:

constructing a greedy embedding in a polylogarhythmic dimensional Euclidian space to achieve routing through geometric routing, including embedding a topological graph of nodes in a network into a metric space in a way to preserve the connectivity property of nodes in the graph;

using a routing table at each node in the network to route packets between nodes in the network using coordinates from the greedy embedding; and wherein a spanning tree is generated by each node attempting to generate the tree routed in itself, and further comprising announcing the tree to its neighbors using a tree message to have the neighbors join the tree or discard the message from the node.

17. The article of manufacture defined in claim 16 wherein the spanning tree is generated using STP.

18. The article of manufacture defined in claim 16 wherein the n-dimensional and k-dimensional spaces are Euclidian spaces.

19. The article of manufacture defined in claim 16 wherein decomposing the tree into branches is performed using either caterpillar decomposition or short-branched decomposition.

20. The article of manufacture defined in claim 16 wherein projecting the n-dimensional coordinate set onto the k-dimensional space comprises transforming coordinates from n to k dimensions using the Achlioptas-modified Johnson-Lindenstrauss random projection method.

21. The article of manufacture defined in claim 16 wherein routing based on the log (n) coordinates uses greedy forwarding to route the packets.

22. The article of manufacture defined in claim 16 wherein the method further comprises entering a recovery phase during routing if a packet reaches a node which is closer to the destination than any of its neighbors, yet does not reach its destination.

* * * * *